US008043181B2

(12) United States Patent
Abe et al.

(10) Patent No.: US 8,043,181 B2
(45) Date of Patent: Oct. 25, 2011

(54) POWER UNIT

(75) Inventors: Noriyuki Abe, Saitama-ken (JP);
Shigemitsu Akutsu, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 852 days.

(21) Appl. No.: 12/149,070

(22) Filed: Apr. 25, 2008

(65) Prior Publication Data
US 2008/0269000 A1   Oct. 30, 2008

(30) Foreign Application Priority Data
Apr. 27, 2007   (JP) ................. 2007-118507

(51) Int. Cl.
*F16H 3/72* (2006.01)

(52) U.S. Cl. ................................................. 475/5

(58) Field of Classification Search ............. 475/5, 269; 180/65.22, 65.235, 65.24, 65.7; 903/911, 903/919
See application file for complete search history.

(56) References Cited

U.S. PATENT DOCUMENTS

| | | | | |
|---|---|---|---|---|
| 3,340,749 A * | 9/1967 | Schreiner et al. | ............. | 475/211 |
| 4,599,916 A * | 7/1986 | Hirosawa | ........................ | 475/210 |
| 4,624,153 A * | 11/1986 | Itoh et al. | ........................ | 475/66 |
| 4,864,889 A * | 9/1989 | Sakakibara et al. | ........... | 475/211 |
| 6,524,217 B1 * | 2/2003 | Murakami et al. | ................. | 477/5 |
| 6,736,753 B2 * | 5/2004 | Endo et al. | ......................... | 477/3 |
| 6,902,512 B2 * | 6/2005 | Kamichi et al. | .............. | 477/108 |
| 7,246,672 B2 * | 7/2007 | Shirai et al. | ................. | 180/65.25 |
| 7,597,648 B2 * | 10/2009 | Conlon et al. | ..................... | 477/4 |
| 7,654,927 B2 * | 2/2010 | Kimura et al. | .................... | 475/5 |
| 7,695,387 B2 * | 4/2010 | Oba | .................................... | 475/5 |
| 7,740,093 B2 * | 6/2010 | Abe et al. | ..................... | 180/65.6 |
| 7,749,130 B2 * | 7/2010 | Muta et al. | ......................... | 477/3 |
| 7,794,348 B2 * | 9/2010 | Tilscher et al. | ................. | 475/53 |
| 7,806,795 B2 * | 10/2010 | Oba et al. | ........................... | 475/5 |
| 7,863,847 B2 * | 1/2011 | Morita et al. | ................. | 318/539 |

(Continued)

FOREIGN PATENT DOCUMENTS

JP      10-341503      12/1998

(Continued)

OTHER PUBLICATIONS

Japanese Office Action, 2007-118507 dated Jan. 27, 2009.

*Primary Examiner* — J. Allen Shriver, II
*Assistant Examiner* — Jacob Meyer
(74) *Attorney, Agent, or Firm* — Squire, Sanders & Dempsey (US) LLP

(57) ABSTRACT

A power unit capable of downsizing rotary motors and enhancing efficiency of the power unit. In first and second planetary gear units, a first ring gear, a first carrier, a second sun gear, a first sun gear, a second carrier, and a second ring gear, capable of transmitting power to each other, are configured such that they satisfy a collinear relationship and are in a line in a collinear chart. The first carrier and the second sun gear are connected to a prime mover, and the first sun gear and the second carrier are connected to drive wheels. The first and second ring gears are connected to the first and second rotary motors, respectively. The first and second rotary motors are connected to each other. A transmission is disposed at least between the first rotary motor and the first ring gear or between the second rotary motor and the second ring gear.

6 Claims, 14 Drawing Sheets

U.S. PATENT DOCUMENTS

| | | | |
|---|---|---|---|
| 7,951,033 B2 * | 5/2011 | Abe | 475/5 |
| 2005/0137042 A1 * | 6/2005 | Schmidt et al. | 475/5 |
| 2005/0221939 A1 * | 10/2005 | Takami et al. | 475/5 |
| 2006/0247086 A1 * | 11/2006 | Watanabe et al. | 475/208 |
| 2007/0066432 A1 * | 3/2007 | Schmidt | 475/5 |
| 2008/0009380 A1 * | 1/2008 | Iwanaka et al. | 475/5 |
| 2008/0103003 A1 * | 5/2008 | Sah et al. | 475/5 |
| 2008/0125264 A1 * | 5/2008 | Conlon et al. | 475/5 |
| 2008/0312021 A1 * | 12/2008 | Oba | 475/5 |
| 2008/0318721 A1 * | 12/2008 | Oba et al. | 475/5 |
| 2011/0034282 A1 * | 2/2011 | Akutsu et al. | 475/5 |
| 2011/0109179 A1 * | 5/2011 | Akutsu et al. | 310/77 |

FOREIGN PATENT DOCUMENTS

| | | |
|---|---|---|
| JP | 2002-281607 | 9/2002 |
| JP | 2003-127681 | 5/2003 |
| JP | 2004-150627 | 5/2004 |
| JP | 2004-239278 | 8/2004 |

* cited by examiner

F I G. 4A
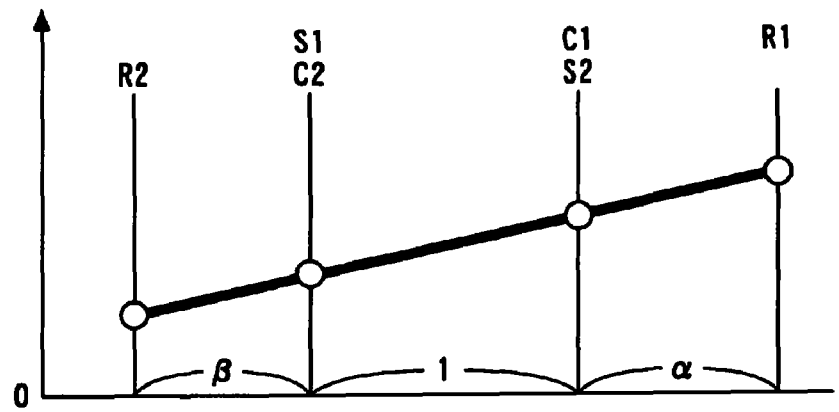
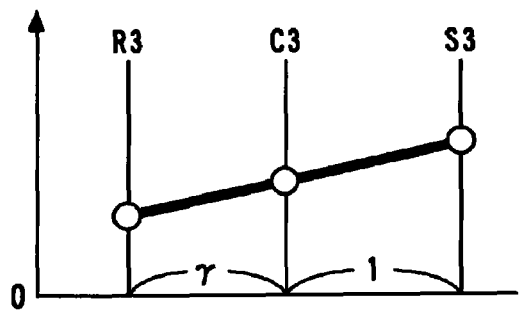
F I G. 4B
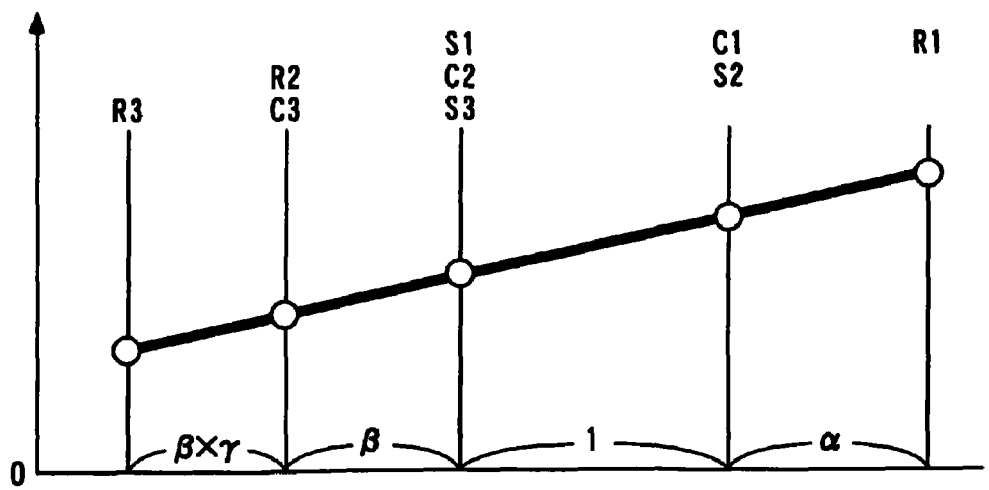

POWER UNIT

BACKGROUND OF THE INVENTION

1. Field of the Invention

The present invention relates to a power unit for driving a driven member, and more particularly to a power unit having an internal combustion engine and rotary motors as power sources.

2. Description of the Related Art

Conventionally, as a power unit of this kind, one disclosed e.g. in Japanese Laid-Open Patent Publication (Kokai) No. 2002-281607 is known. This power unit is for driving drive wheels of a vehicle, and is provided with an internal combustion engine, a first rotary motor, and a second rotary motor, which are power sources, a first planetary gear unit and a second planetary gear unit, which are of a general type. A carrier of the first planetary gear unit and a sun gear of the second planetary gear unit are directly connected to each other without using a gear or a transmission and are directly connected to the engine. A ring gear of the first planetary gear unit and a carrier of the second planetary gear unit are directly connected to each other and are connected to the drive wheels. Further, a sun gear of the first planetary gear unit and a ring gear of the second planetary gear unit are directly connected to the first rotary motor and the second rotary motor, respectively.

In the power unit configured as above, the drive wheels are driven using power from the engine and the first and second rotary motors according to traveling conditions of the vehicle. Further, power generation is performed by the first rotary motor using part of power from the engine, to supply the generated electric power to the second rotary motor, and the rotational speeds of the first and second rotary motors are controlled to thereby transmit power from the engine (prime mover) to the drive wheels while changing the rotational speed of the engine.

In the above-described conventional power unit, depending on traveling conditions of the vehicle and operating state of the engine, torque from the first and second rotary motors sometimes becomes too large, or the rotational speeds of the first and second rotary motors sometimes become very high. However, in the conventional power unit, the first and second rotary motors are directly connected to the sun gear of the first planetary gear unit and the ring gear of the second planetary gear unit, respectively, and therefore, to cope with the former case, it is required to use large-sized rotary motors as the first and second rotary motors. Further, for the same reason, in the latter case in which the rotational speeds of the first and second rotary motors become too high, dragging losses are caused due to dragging of the first and second rotary motors. This results in the degraded efficiency of the whole power unit.

Furthermore, in the conventional power unit, in changing the rotational speed of the engine as described above, particularly during a high-speed operation of the vehicle in which the rotational speed of the drive wheels is higher than that of the engine, the rotational speed of the second rotary motor becomes very high due to the above-described connection relationship, which sometimes causes dragging losses. To avoid this problem, it is only required to increase the rotational speed of the engine to decrease the rotational difference between the rotational speed of the drive wheels and that of the engine. In this case, however, the best fuel economy of the engine cannot be obtained, and the efficiency of the whole power unit is degraded after all.

SUMMARY OF THE INVENTION

It is an object of the present invention to provide a power unit that is capable of downsizing rotary motors and enhancing the efficiency of the power unit.

To attain the above object, the present invention provides a power unit for driving a driven member, comprising a prime mover, a power transmission mechanism that includes at least first to fourth elements capable of transmitting power to each other, the first to fourth elements being configured such that respective rotational speeds of the first to fourth elements satisfy a collinear relationship and are in a line in a collinear chart representing the collinear relationship, the second element and the third element being mechanically connected to the prime mover and the driven member, respectively, a first rotary motor mechanically connected to the first element, a second rotary motor mechanically connected to the fourth element and electrically connected to the first rotary motor, and a transmission disposed at least one of respective locations between the first rotary motor and the first element and between the second rotary motor and the fourth element.

With the arrangement of the power unit according to the present invention, the first to fourth elements which are capable of transmitting power to each other and are configured such that the respective rotational speeds thereof satisfy the collinear relationship are in a line in the collinear chart representing the collinear relationship. The second and third elements are mechanically connected to the prime mover and the driven member, respectively. Further, the first and second rotary motors are mechanically connected to the first and fourth elements, respectively. The first and second rotary motors are electrically connected to each other. Furthermore, the transmission is disposed at least between the first rotary motor and the first element or between the second rotary motor and the fourth element. With the arrangement described above, the driven member can be driven using e.g. motive powers from the prime mover and the first and second rotary motors.

Further, in this case, for example, by generating electric power by the first rotary motor using part of power from the prime mover to supply the generated electric power to the second rotary motor, and controlling the respective rotational speeds of the first and second rotary motors, it is possible to transmit the power from the prime mover to the driven member while steplessly changing the rotational speed. More specifically, the relationship between the respective rotational speeds of the prime mover, the driven member, and the first and second rotary motors is shown as in FIG. 12 from the above-described connecting relationship, when no change in rotational speed is caused by the transmission. As indicated by a broken line in FIG. 12, by controlling the rotational speed of the first rotary motor to a higher value and that of the second rotary motor to a lower value than the rotational speed of the prime mover, it is possible to transmit the power from the prime mover to the driven member while steplessly reducing the rotational speed. Inversely, as indicated by a one-dot chain line in FIG. 12, by controlling the rotational speed of the first rotary motor to a lower value and that of the second rotary motor to a higher value than the rotational speed of the prime mover, it is possible to transmit the power from the prime mover to the driven member while steplessly increasing the rotational speed.

Furthermore, by changing the rotational speed of at least one of the first and second rotary motors by the above-described transmission, it is possible to reduce the maximum torque regenerated by the rotary motor, thereby making it possible to downsize the rotary motor. Further, the change in the rotational speed by the transmission makes it possible to prevent the rotational speed of the rotary motor from becoming too large to thereby prevent occurrence of dragging losses. This makes it possible to enhance the efficiency of the power unit as a whole.

Preferably, the power transmission mechanism comprises a plurality of planetary gear units combined with each other.

With the arrangement of this preferred embodiment, a plurality of existing planetary gear units combined with each other are used as the power transmission mechanism, and hence it is possible to construct the power unit easily and inexpensively without using a special mechanism. Further, the planetary gear unit has a characteristic that a torque-transmitting capacity thereof is relatively large with respect to a size thereof. Therefore, according to the present invention, it is possible to downsize the power transmission mechanism, thereby making it possible to downsize the power unit.

Preferably, the transmission is disposed between the second rotary motor and the fourth element.

As described above, during changing of the speed of the power from the prime mover by the first and second rotary motors, electric power generated using part of the power from the prime mover is supplied to the second rotary motor, so that during a high-load operation of the power unit, to cope with high load on the driven member, the torque of the prime mover is increased, and accordingly, the torque of the second rotary motor also becomes larger. Further, during changing of the speed of the power from the prime mover by the first and second rotary motors, as is apparent from a collinear chart in FIG. 12, the distance between the prime mover and the first rotary motor is small and the rotational difference between the rotational speed of the prime mover and that of the first rotary motor is small, so that the rotational speed of the first rotary motor does not become so high. On the other hand, in the collinear chart, the distance between the prime mover and the second rotary motor is large and the rotational difference between the rotational speed of the prime mover and that of the second rotary motor is larger than the rotational difference between the rotational speed of the prime mover and that of the first rotary motor, so that the rotational speed of the second rotary motor becomes very high during a high-speed operation of the power unit in which the rotational speed of the driven member is higher than that of the prime mover.

With the arrangement of this preferred embodiment, since the transmission is disposed between the second rotary motor and the element to which the second rotary motor is connected, by changing the rotational speed of the power by the transmission, it is possible to reduce torque demanded of the second rotary motor for generation during the high-load operation of the prime mover and reduce the rotational speed of the second rotary motor during the high-speed operation of the power unit. This makes it possible to downsize the second rotary motor and prevent occurrence of dragging losses to enhance the efficiency of the whole power unit during the high-speed operation of the prime mover.

More preferably, the transmission includes a planetary gear unit that has a sun gear, a ring gear, and a carrier rotatably supporting a planetary gear in mesh with the sun gear and the ring gear, a first clutch, and a second clutch, one of the sun gear and the ring gear being mechanically connected to the third element, the carrier being mechanically connected to the fourth element and being mechanically connected to the second rotary motor via the first clutch, and the other of the sun gear and the ring gear being mechanically connected to the second rotary motor via the second clutch.

With the arrangement of this preferred embodiment, one of the sun gear and the ring gear (hereinafter referred to as "the one gear") is connected to the third element connected to the driven member, and the carrier is connected to the fourth element. The carrier is connected to the second rotary motor via the first clutch. Further, the other of the sun gear and the ring gear (hereinafter referred to as "the other gear") is connected to the second rotary motor via the second clutch.

Based on the above-described connecting relationship, the relationship between the respective rotational speeds of the prime mover, the driven member, the first and second rotary motors, the one gear, the carrier, and the other gear is represented, e.g. as shown in FIG. 13A, when the first clutch is engaged to thereby connect the second rotary motor to the carrier and the second clutch is disengaged to thereby disconnect between the second rotary motor and the other gear (hereinafter referred to as "the first transmission mode"). Further, when the first clutch is disengaged to thereby disconnect between the second rotary motor and the carrier and the second clutch is engaged to thereby connect the second rotary motor to the other gear (hereinafter referred to as "the second transmission mode"), the above relationship is represented e.g. as shown in FIG. 13B.

As is apparent from collinear charts in FIGS. 13A and 13B, the distance between the driven member and the second rotary motor is smaller in the first transmission mode, and hence the ratio (D2/D1) between the rotational difference D2 between the rotational speed of the second rotary motor and that of the driven member and the rotational difference D1 between the rotational speed of the driven member and that of the prime mover is smaller in the first transmission mode. Therefore, by using the first transmission mode during the aforementioned high-speed operation of the power unit, it is possible to prevent the excessive rotation of the second rotary motor.

Further, in the collinear charts shown in FIGS. 13A and 13B, assuming that the distance between the prime mover and the driven member is represented by 1, the distance between first rotary motor and the prime mover by W, the distance between the one gear and the carrier by X, and the distance between the carrier and the other gear by Y. In this case, assuming that the respective torques of the prime mover, the driven member, and the first and second rotary motors are represented by TPM, TOUT, TM1, and TM2, the relationship between the torques TPM, TOUT, TM1, and TM2 during changing of the speed of the power from the prime mover by the first and second rotary motors and in the first transmission mode is expressed e.g. by the following equations (1) and (2):

$$TPM+TM2=TOUT+TM1 \quad (1)$$

$$TM2=(1/X)\times\{TPM-(W+1)\times TM1\} \quad (2)$$

Further, the relationship between the torque TPM of the prime mover, the torque TOUT of the driven member, and the torques TM1 and TM2 of the first and second rotary motors during changing of the speed of the power from the prime mover by the first and second rotary motors and in the second transmission mode is expressed e.g. by the following equations (3) and (4):

$$TPM+TM2=TOUT+TM1 \quad (3)$$

$$TM2=\{1/(X+Y)\}\times\{TPM-(W+1)\times TM1\} \quad (4)$$

As is apparent from the above-described equations (2) to (4), the torque TM2 of the second rotary motor is smaller in the second transmission mode. Therefore, by using the second transmission mode during the aforementioned high-load operation of the power unit, it is possible to reduce the torque demanded of the second rotary motor for generation. Further, for example, by switching between the above first and second transmission modes when the rotational speed of the carrier and that of the other gear are equal to each other as shown in FIG. 14, it is possible to smoothly switch between the modes while maintaining the respective rotations of the driven member and the prime mover, thereby making it possible to ensure excellent drivability.

Preferably, the transmission is disposed between the first rotary motor and the first element, the transmission including a planetary gear unit that has a sun gear, a ring gear, and a carrier rotatably supporting a planetary gear in mesh with the sun gear and the ring gear, a first clutch, and a second clutch, one of the sun gear and the ring gear being mechanically connected to the second element, the carrier being mechanically connected to the first element and being mechanically connected to the first rotary motor via the first clutch, and the other of the sun gear and the ring gear being mechanically connected to the first rotary motor via the second clutch.

With the arrangement of this preferred embodiment, one of the sun gear and the ring gear (hereinafter referred to as "the first gear") is connected to the second element connected to the prime mover, and the carrier is connected to the first element. The carrier is connected to the first rotary motor via the first clutch. Further, the other of the sun gear and the ring gear (hereinafter referred to as "the second gear") is connected to the first rotary motor via the second clutch.

From the above-described connecting relationship, the relationship between the respective rotational speeds of the prime mover, the driven member, the first and second rotary motors, the first gear, the carrier, and the second gear is represented e.g. as shown in FIG. 15A, when the first clutch is engaged to thereby connect the first rotary motor to the carrier and the second clutch is disengaged to thereby disconnect between the first rotary motor and the second gear (hereinafter referred to as "the third transmission mode"). Further, when the first clutch is disengaged to thereby disconnect between the first rotary motor and the carrier and the second clutch is engaged to thereby connect the first rotary motor to the second gear (hereinafter referred to as "the fourth transmission mode"), the relationship is represented e.g. as in shown FIG. 15B.

As is apparent from collinear charts in FIGS. 15A and 15B, the distance between the driven member and the first rotary motor is smaller in the third transmission mode, and hence the ratio (D4/D3) between the rotational difference D4 between the rotational speed of the first rotary motor and that of the driven member and the rotational difference D3 between the rotational speed of the driven member and that of the prime mover is smaller in the third transmission mode. On the other hand, for example, to rapidly increase the rotational speed of the driven member from a low state thereof, if the torque and rotational speed of the prime mover are caused to be rapidly increased and power is caused to be generated by the first rotary motor, the rotational speed of the driven member is not immediately increased at the start of the operation. This makes the rotational speed of the prime mover higher than that of the driven member, and the rotational speed of the first rotary motor much higher than that of the driven member. In this case, by using the third transmission mode, it is possible to prevent the excessive rotation of the first rotary motor.

Further, in the collinear charts shown in FIGS. 15A and 15B, it is assumed that the distance between the prime mover and the driven member represented by 1, the distance between the second gear and the carrier by A, the distance between the carrier and the first gear by B, and the distance between the driven member and the second rotary motor by C. In this case, similarly to the case of the first and second transmission modes, assuming that the respective torques of the prime mover, the driven member, and the first and second rotary motors are represented by TPM, TOUT, TM1, and TM2, the relationship between the torques TPM, TOUT, TM1, and TM2 in the third transmission mode is expressed e.g. by the following equations (5) and (6):

$$TOUT = TM1 + TPM + TM2 \quad (5)$$

$$TM1 = \{1/(1+B)\} \times (C \times TM2 - TPM) \quad (6)$$

Further, in the fourth transmission mode, the relationship between the torque TPM of the prime mover, the torque TOUT of the driven member, and the torques TM1 and TM2 of the first and second rotary motors is expressed e.g. by the following equations (7) and (8):

$$TOUT = TM1 + TPM + TM2 \quad (7)$$

$$TM1 = \{1/(1+A+B)\} \times (C \times TM2 - TPM) \quad (8)$$

As is apparent from the above-described equations (7) and (8), the torque TM1 of the first rotary motor is smaller in the fourth transmission mode. Therefore, in the case of the prime mover being the engine, by using the fourth transmission mode when the power of the first rotary motor is used to start the engine, it is possible to reduce the torque demanded of the first rotary motor for generation. Further, similarly to the case of the first and second transmission modes, e.g. by switching between the above third and fourth transmission modes when the rotational speed of the carrier and that of the second gear are equal to each other, it is possible to smoothly switch between the modes while maintaining the rotations of the driven member and the prime mover, thereby making it possible to ensure excellent drivability.

Preferably, the transmission comprises a first transmission disposed between the first rotary motor and the first element and a second transmission disposed between the second rotary motor and the fourth element, the first transmission including a first planetary gear unit that has a first sun gear, a first ring gear, and a first carrier rotatably supporting a first planetary gear in mesh with the first sun gear and the first ring gear, a first clutch, and a second clutch, the second transmission including a second planetary gear unit that has a second sun gear, a second ring gear, and a second carrier rotatably supporting a second planetary gear in mesh with the second sun gear and the second ring gear, a third clutch, and a fourth clutch, one of the first sun gear and the first ring gear being mechanically connected to the second element, the first carrier being mechanically connected to the first element and being mechanically connected to the first rotary motor via the first clutch, the other of the first sun gear and the first ring gear being mechanically connected to the first rotary motor via the second clutch, one of the second sun gear and the second ring gear being mechanically connected to the third element, the second carrier being mechanically connected to the fourth element and being mechanically connected to the second rotary motor via the third clutch, and the other of the second sun gear and the second ring gear being mechanically connected to the second rotary motor via the fourth clutch.

With the arrangement of this preferred embodiment, one of the first sun gear and the first ring gear is connected to the second element connected to the prime mover, and the first carrier is connected to the first element. Further, the first carrier is connected to the first rotary motor via the first clutch.

The other of the first sun gear and the first ring gear is connected to the first rotary motor via the second clutch. Further, one of the second sun gear and the second ring gear is connected to the third element connected to the driven member. The second carrier is connected to the fourth element. The second carrier is connected to the second rotary motor via the third clutch. Further, the other of the second sun gear and the second ring gear is connected to the second rotary motor via the fourth clutch.

As is apparent from the above-described arrangement, according to this preferred embodiment, it is possible to reduce the torques demanded of the first and second rotary motors for generation, and smoothly switch between transmission modes while maintaining the rotations of the driven member and the prime mover, thereby making it possible to ensure excellent drivability.

The above and other objects, features, and advantages of the present invention will become more apparent from the following detailed description taken in conjunction with the accompanying drawings.

BRIEF DESCRIPTION OF THE DRAWINGS

FIG. 4A is a view showing a collinear chart illustrating the example of the relationship between the rotational speeds of the four rotary elements formed by the first and second planetary gear units appearing in FIG. 1, together with a collinear chart illustrating an example of the relationship between the respective rotational speeds of a third sun gear, a third carrier, and a third ring gear appearing in FIG. 1;

FIG. 4B is a view showing a collinear chart illustrating an example of the relationship between the respective rotational speeds of five rotary elements formed by the first to third planetary gear units appearing in FIG. 1;

DETAILED DESCRIPTION OF PREFERRED EMBODIMENTS

Figure 1:
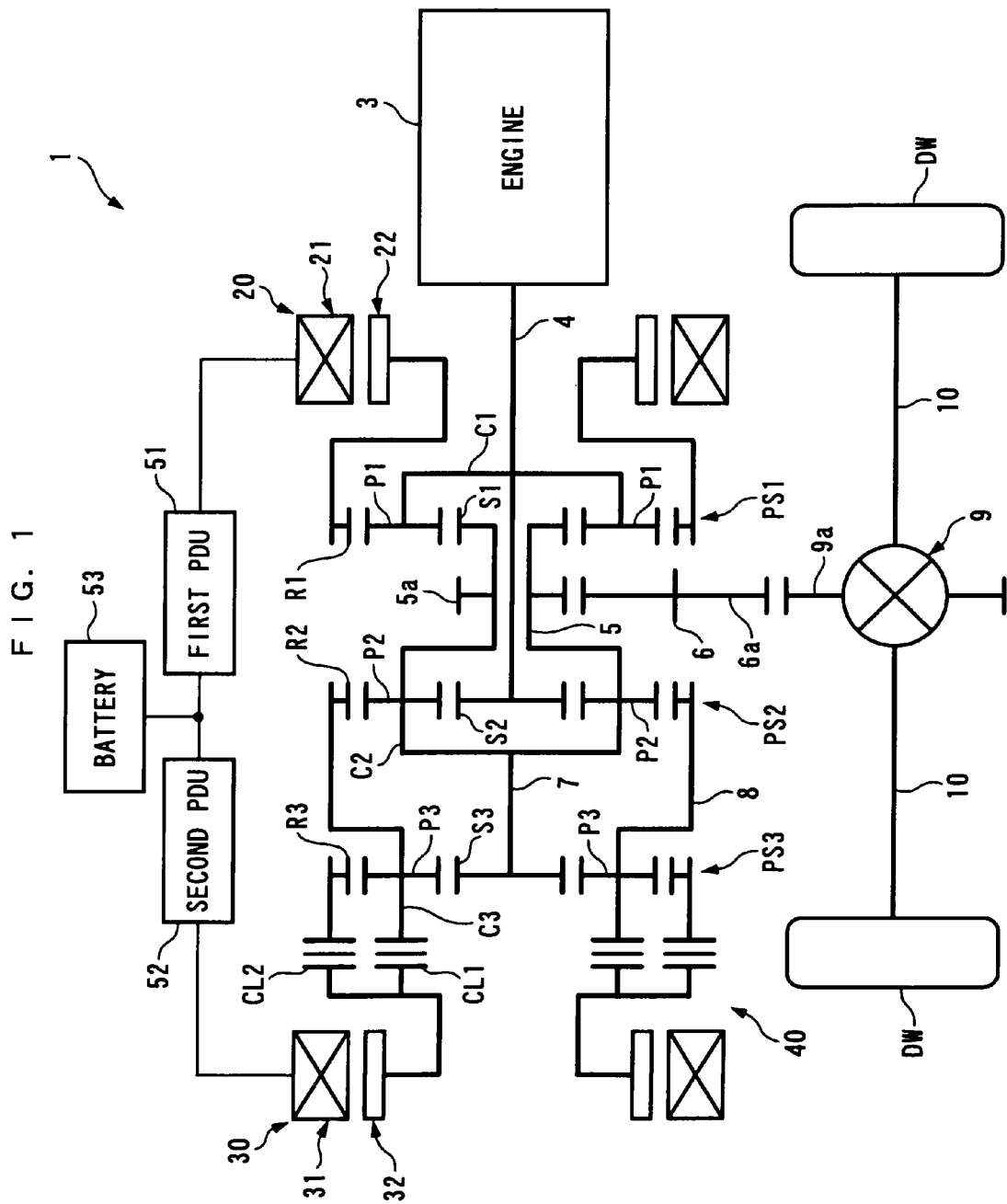
FIG. 1 is a schematic view of a power unit according to a first embodiment of the present invention.
Figure 2:
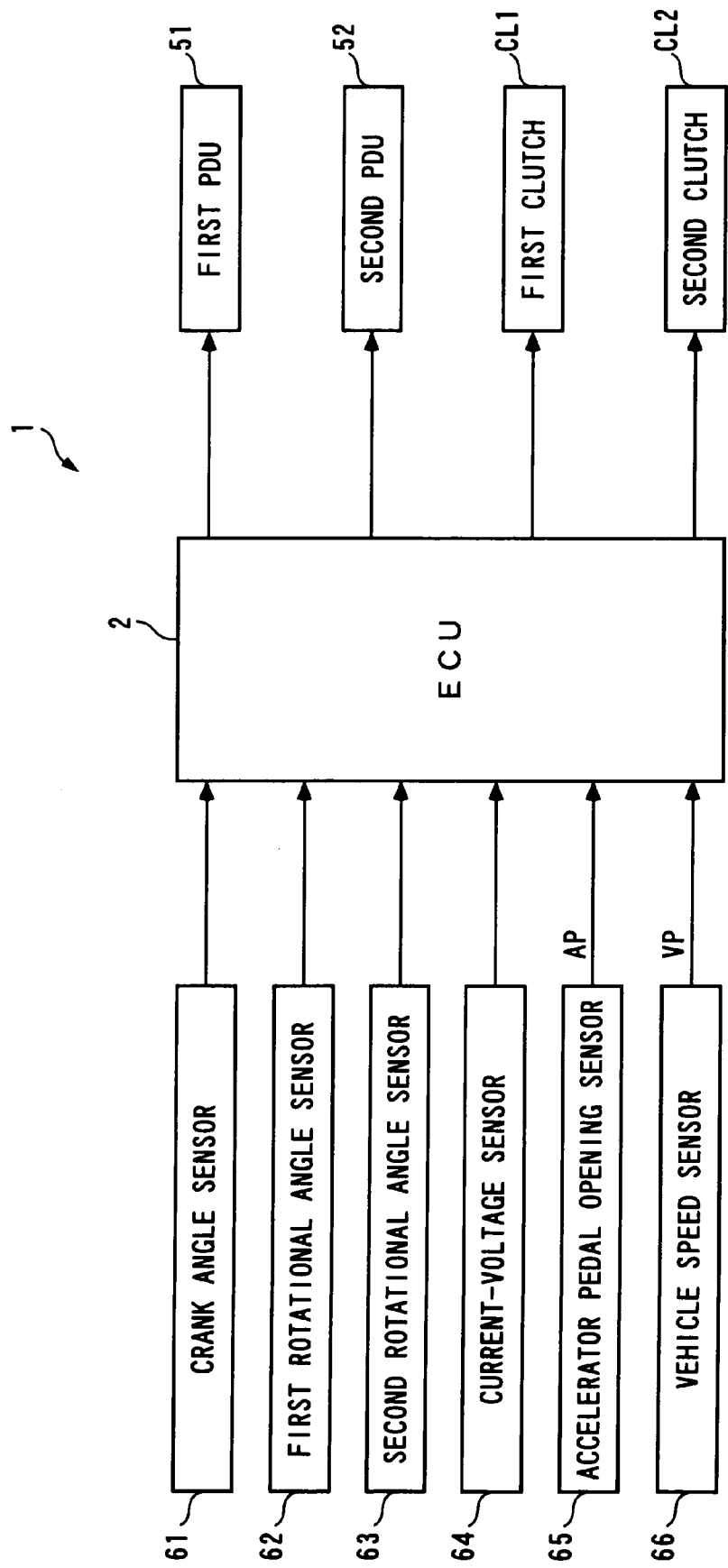
FIG. 2 is a schematic block diagram of part of the FIG. 1 power unit.

The invention will now be described in detail with reference to the drawings showing preferred embodiments thereof. FIGS. 1 and 2 schematically show a power unit 1 according to a first embodiment of the present invention. The power unit 1 is for driving left and right drive wheels DW and DW (driven member) of a vehicle, not shown, and is, as shown in FIG. 1, comprised of an internal combustion engine 3 (prime mover), a first rotary motor 20, a second rotary motor 30, which are power sources, and a first planetary gear unit PS1 (power transmission mechanism, one of a plurality of planetary gear units) and a second planetary gear unit PS2 (power transmission mechanism, one of the plurality of planetary gear units), a transmission 40, a differential gear mechanism 9, and left and right drive shafts 10 and 10, for transmitting a driving force to the drive wheels DW and DW. The internal combustion engine (hereinafter simply referred to as "the engine") 3 is an gasoline engine, for example. The differential gear mechanism 9 is connected to the drive wheels DW and DW via the drive shafts 10 and 10.

Further, referring to FIG. 2, the power unit 1 includes an ECU 2 for controlling the operations of the engine 3, and the first and second rotary motors 20 and 30, a first power drive unit (hereinafter referred to as "the first PDU") 51, and a second power drive unit (hereinafter referred to as "the second PDU") 52.

The above-described first planetary gear unit PS1 is of a general type, and is comprised of a first sun gear S1, a first ring gear R1 provided on an outer periphery of the first sun gear S1, a plurality of (e.g. three) first planetary gears P1 (only two of which are shown) in mesh with the gears S1 and R1, and a first carrier C1 that rotatably supports the first planetary gears P1. Further, the second planetary gear unit PS2 is constructed similarly to the first sun gear S1, and is comprised of a second sun gear S2, a second ring gear R2, a plurality of second planetary gears P2 in mesh with the gears S2 and R2, and a second carrier C2 that rotatably supports the second planetary gears P1.

Further, the first carrier C1 of the first planetary gear unit PS1 and the second sun gear S2 of the second planetary gear unit PS2 are integrally formed with a first connection shaft 4. The first connection shaft 4 is concentrically connected to a crankshaft, not shown, of the engine 3, and is rotatably supported by bearings, not shown. Furthermore, the first sun gear S1 of the first planetary gear unit PS1 and the second carrier C2 of the second planetary gear unit PS2 are integrally formed with a second connection shaft 5. The second connection shaft 5 is formed to be hollow, and is rotatably supported by bearings, not shown. The above-described first connection shaft 4 is rotatably fitted in the second connection shaft 5. Further, the second connection shaft 5 is integrally formed with a gear 5a. The gear 5a is in mesh with an idler gear 6a formed integrally with an idler shaft 6, and the idler gear is in mesh with a gear 9a of the differential gear mechanism 9.

As described above, the first carrier C1, the second sun gear S2. and the crankshaft of the engine 3 are mechanically connected to each other via the first connection shaft 4. Further, the first sun gear S1 and the second carrier C2 are mechanically connected to each other via the second connection shaft 5, and are mechanically connected to the drive wheels DW and DW via the idler shaft 6 and the differential gear mechanism 9.

The transmission 40 includes a third planetary gear unit PS3, and first and second clutches CL1 and CL2. The third planetary gear unit PS3 is constructed similarly to the first planetary gear unit PS1, and is comprised of a third sun gear S3, a third ring gear R3, a plurality of third planetary gears P3, and a third carrier C3.

Further, the second carrier C2 of the second planetary gear unit PS2, and the third sun gear S3 of the third planetary gear unit PS3 are integrally formed with a third connection shaft 7, and is mechanically connected to each other via the third connection shaft 7. The third connection shaft 7 is rotatably supported by bearings, not shown, and is disposed concentrically with the first connection shaft 4. Further, the second ring gear R2 of the second planetary gear unit PS2 and the third carrier C3 of the third planetary gear unit PS3 are integrally formed with a fourth connection shaft 8, and are mechanically connected to each other via the fourth connection shaft 8. The fourth connection shaft 8 is formed to be hollow, and is rotatably supported by bearings, not shown. The third connection shaft 7 is rotatably fitted in the fourth connection shaft 8.

It should be noted that although in the present embodiment, the numbers of gear teeth of the first to third sun gears S1, S2 and S3 are set to be equal to each other, and the numbers of gear teeth of the first to third ring gears R1, R2 and R3 are set to be equal to each other, they are not necessarily required to be equal to each other.

The above-described first clutch CL1 is formed by a friction multiple disk clutch, and is disposed between the third carrier C3 and a second rotor 32, referred to hereinafter, of the second rotary motor 30. Further, the degree of engagement of the first clutch CL1 with the second rotor 32 and the third carrier C3 is controlled by the ECU 2, to thereby connect and disconnect between the second rotor 32 and the third carrier C3. Similarly to the first clutch CL1, the second clutch CL2 is formed by a friction multiple disk clutch, and is disposed between the third ring gear R3 and the second rotor 32. Further, the degree of engagement of the second clutch CL2 with the second rotor 32 and the third ring gear R3 is controlled by the ECU 2, to thereby connect and disconnect between the second rotor 32 and the third ring gear R3.

The above-described first rotary motor 20 is e.g. a three-phase brushless DC motor, and is integrally formed with the above-described first planetary gear unit PS1. The first rotary motor 20 is comprised of a first stator 21 formed e.g. by a plurality of coils, not shown, and a first rotor 22 which is formed e.g. by a plurality of magnets, not shown, and is disposed in a manner opposed to the first stator 21. The first stator 21 is fixed to a casing, not shown, and is electrically connected to a battery 53 and the ECU 2 via the first PDU 51. The first PDU 51 is formed by an electric circuit, such as an inverter. The first rotor 22 is integrally formed with the above-described first ring gear R1 such that it is rotatable in unison with the first ring gear R1.

In the first rotary motor 20, when electric power is supplied to the first stator 21, a rotating magnetic field is generated in the first stator 21 to thereby rotate the first rotor 22. Further, when no electric power is supplied to the first stator 21, if the first rotor 22 is rotated with respect to the first stator 21, a rotating magnetic field is generated in the first stator 21 to generate electric power. The ECU 2 controls the first PDU 51 to thereby control the electric power supplied to the first rotary motor 20, the electric power generated in the first rotary motor 20, and the rotational speed NRO1 of the first rotor 22 (hereinafter referred to as "the first rotor speed NRO1").

Similarly to the first rotary motor 20, the aforementioned second rotary motor 30 is e.g. a three-phase brushless DC motor. The second rotary motor 30 is comprised of a second stator 31 formed e.g. by a plurality of coils, not shown, and a rotatable second rotor 32 which is formed e.g. by a plurality of magnets, not shown, and is disposed in a manner opposed to the second stator 31. The second stator 31 is fixed to a casing, not shown, and is electrically connected to the battery 53 and the ECU 2 via the rotatable second PDU 52. Similarly to the first PDU 51, the second PDU 52 is formed by an electric circuit, such as an inverter, and is electrically connected to the first PDU 51.

Further, in the second rotary motor 30, when electric power is supplied to the second stator 31, a rotating magnetic field is generated in the second stator 31 to thereby rotate the second rotor 32. Further, when no electric power is supplied to the second stator 31, if the second rotor 32 is rotated with respect to the second stator 31, a rotating magnetic field is generated in the second stator 31 to generate electric power. The ECU 2 controls the second PDU 52 to thereby control the electric power supplied to the second rotary motor 30, the electric power generated in the second rotary motor 30, and the rotational speed NRO2 of the second rotor 32 (hereinafter referred to as "the second rotor speed NRO2").

Referring to FIG. 2, a crank angle sensor 61 detects the crank angle position of the crankshaft, and delivers a signal indicative of the detected crank angle position to the ECU 2. The ECU 2 calculates the rotational speed NE of the engine 3 (hereinafter referred to as "the engine speed NE") based on the crank angle position. Further, a first rotational angle sensor 62 detects the rotational angle position of the first rotor 22, and delivers a signal indicative of the sensed rotational angle position to the ECU 2. The ECU 2 calculates the first rotor speed NRO1 based on the sensed rotational angle position of the first rotor 22. Furthermore, a second rotational angle sensor 63 detects the rotational angle position of the second rotor 32, and delivers a signal indicative of the sensed rotational angle position to the ECU 2. The ECU 2 calculates the second rotor speed NRO2 based on the sensed rotational angle position of the second rotor 32.

Further, a current-voltage sensor 64 detects the values of electric current and voltage input to and output from the battery 53, and delivers signals indicative of the detected values of the electric current and voltage. The ECU 2 calculates the remaining capacity SOC of the battery 53 based on the signals from the current-voltage sensor 64. Further, an accelerator pedal opening sensor 65 detects an accelerator pedal opening AP, which is a stepped-on amount of an accelerator pedal, not shown, of the vehicle, and delivers a signal indicative of the detected accelerator pedal opening AP to the ECU 2. A vehicle speed sensor 66 detects a vehicle speed VP, and delivers a signal indicative of the detected vehicle speed VP to the ECU 2.

The ECU 2 is implemented by a microcomputer comprised of an I/O interface, a CPU, a RAM, and a ROM, and controls the operations of the engine 3 and the first and second rotary motors 20 and 30 based on the signals from the aforementioned sensors 61 to 66.

Figure 3A:
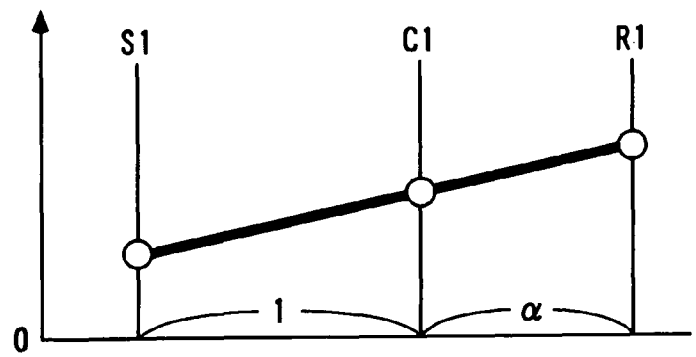
FIG. 3A is a view showing a collinear chart illustrating an example of the relationship between the respective rotational speeds of a first sun gear, a first carrier, and a first ring gear appearing in FIG. 1, together with a collinear chart illustrating an example of the relationship between the respective rotational speeds of a second sun gear, a second carrier, and a second ring gear appearing in FIG. 1.
Figure 3A:
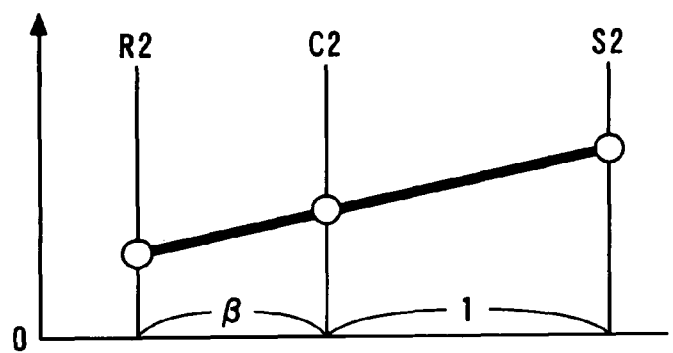
Figure 3A:
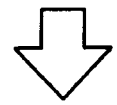

FIG. 3A shows a collinear chart illustrating an example of the relationship between the respective rotational speeds of the first sun gear S1, the first carrier C1, and the first ring gear R1, together with a collinear chart illustrating an example of the relationship between the respective rotational speeds of the second sun gear S2, the second carrier C2, and the second ring gear R2. In FIG. 3A, $\alpha$ represents ZS1/ZR1, and $\beta$ represents ZS2/ZR2, wherein ZS1 and ZS2 represent the number of the gear teeth of the first sun gear S1 and that of the gear teeth of the second sun gear S2, respectively, and ZR1 and ZR2 represent the number of the gear teeth of the first ring gear and that of the gear teeth of the second ring gear R2, respectively. As described above, in each collinear chart, the sun gear, the carrier, and the ring gear are shown in a manner arranged side by side in the direction of the horizontal axis, and the rotational speeds thereof are shown by the vertical axis, while the distances between the sun gear, the carrier, and the ring gear in the direction of the horizontal axis are defined based on the gear teeth of the sun gear and the ring gear. In each collinear chart, the rotational speeds of the sun gear, the carrier and the ring gear are on a straight line, which means that they are in a collinear relationship.

Figure 3B:
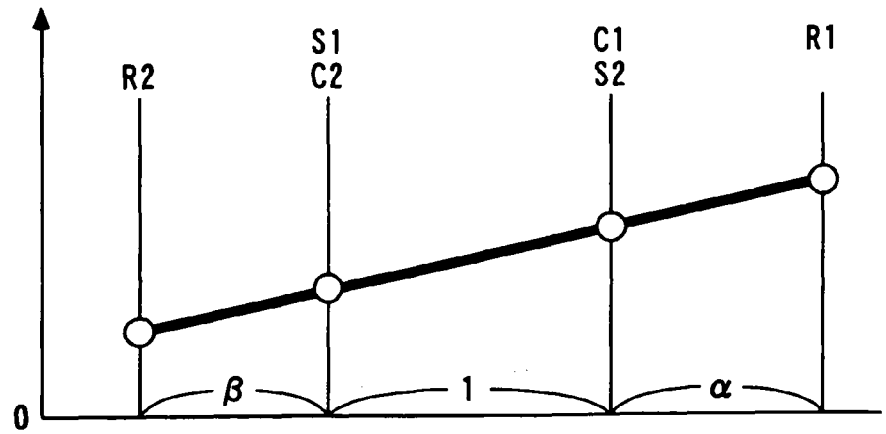
FIG. 3B is a view showing a collinear chart illustrating an example of the relationship between the respective rotational speeds of four rotary elements formed by first and second planetary gear units appearing in FIG. 1.

As described above, since the first carrier C1 and the second sun gear S2 are connected to each other, the rotational speed of the first carrier C1 and that of the second sun gear S2 are equal to each other, and since the first sun gear S1 and the second carrier C2 are connected to each other, the rotational speed of the first sun gear S1 and that of the second carrier C2 are equal to each other. Therefore, the two collinear charts concerning the first and second planetary gear units PS1 and PS2 shown in FIG. 3A can be represented by one collinear chart as shown in FIG. 3B. As shown in FIG. 3B, four rotary elements rotational speeds of which are in a collinear relationship with each other are formed by connecting the elements of the first and second planetary gear units PS1 and PS2, as described above.

In the present embodiment, the first ring gear R1 corresponds to a first element, the first carrier C1 and the second sun gear S2 to a second element, the first sun gear S1 and the second carrier C2 to a third element, and the second ring gear R2 to a fourth element.

Further, FIG. 4A shows a collinear chart illustrating an example of the relationship between the respective rotational speeds of the above-describe four rotary elements, together with a collinear chart illustrating an example of the relationship between the respective rotational speeds of the third sun gear S3, the third carrier C3, and the third ring gear R3. In FIG. 4A, $\gamma$ represents ZS3/ZR3, and ZS3 and ZR3 represent the number of the gear teeth of the third sun gear S3 and that of the gear teeth of the third ring, gear R3, respectively.

As described above, since the second carrier C2 and the third sun gear S3 are connected to each other, the rotational speed of the second carrier C2 and that of the third sun gear S3 are equal to each other, and since the second ring gear R2 and the third carrier C3 are connected to each other, the rotational speed of the second ring gear R2 and that of the third carrier C3 are equal to each other. Therefore, the two collinear charts shown in FIG. 4A are shown by one collinear chart as shown in FIG. 4B. As shown in FIG. 4B, the five rotary elements the respective rotational speeds of which are in a collinear relationship are formed by connecting the elements of the first to third planetary gear units PS1 to PS3, as described above.

Further, since the first rotary motor 20 and the first ring gear R1 are connected to each other, the first rotor speed NRO1 and the rotational speed of the first ring gear R1 are equal to each other, and since the engine 3, the first carrier C1, and the second sun gear S2 are connected to each other, the engine speed NE, and the respective rotational speeds of the first carrier C1 and the second sun gear S2 are equal to each other. Furthermore, since the drive wheels DW and DW, the first sun gear S1, the second carrier C2, and the third sun gear S3 are connected to each other, if a change in speed e.g. by the differential gear mechanism 9 is ignored, the vehicle speed VP and the respective rotational speeds of the first sun gear S1, the second carrier C2, and the third sun gear S3 are equal to each other.

Further, the second rotary motor 30 is connected to the third carrier C3 and the third ring gear R3 via the first and second clutches CL1 and CL2, respectively, so that when the first clutch CL1 is engaged and the second clutch CL2 is disengaged (hereinafter, this state of the first and second clutches is referred to as "the first transmission mode"), the second rotor speed NRO2 and the rotational speed of the third carrier C3 are equal to each other. Furthermore, when the first clutch CL1 is disengaged and the second clutch CL2 is engaged (hereinafter, this state of the first and second clutches is referred to as "the second transmission mode"), the second rotor speed NRO2 and the rotational speed of the third ring gear R3 are equal to each other.

Figure 5:
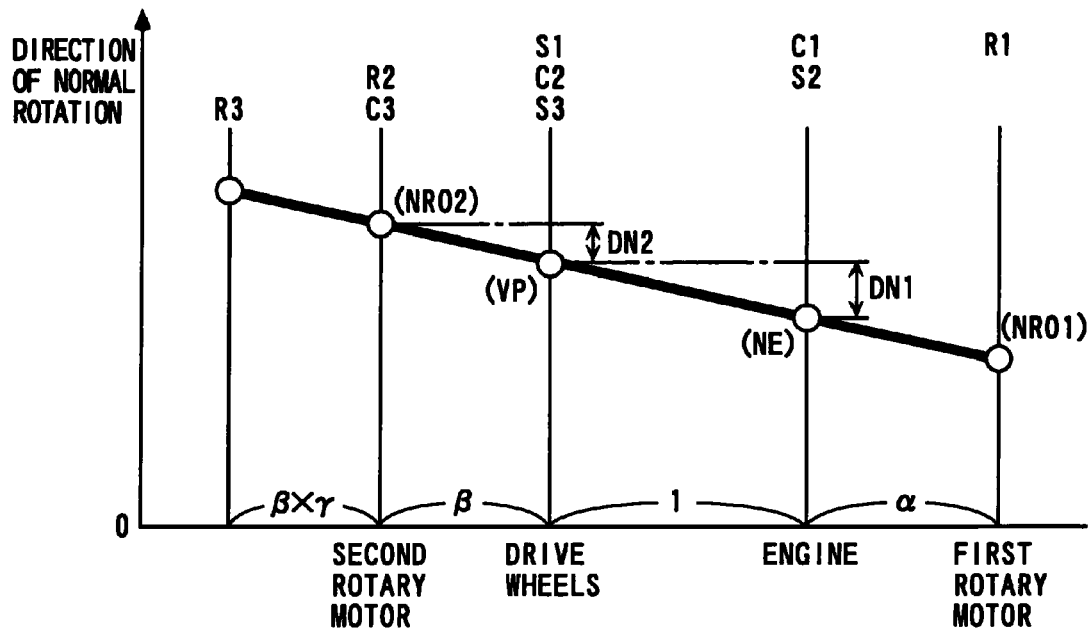
FIG. 5 is a view showing a collinear chart illustrating an example of the relationship between the respective rotational speeds of the five rotary elements formed by the first to third planetary gear units appearing in FIG. 1, the rotational speed of the engine, a vehicle speed, and the rotational speeds of first and second rotors, in a first transmission mode.
Figure 6:
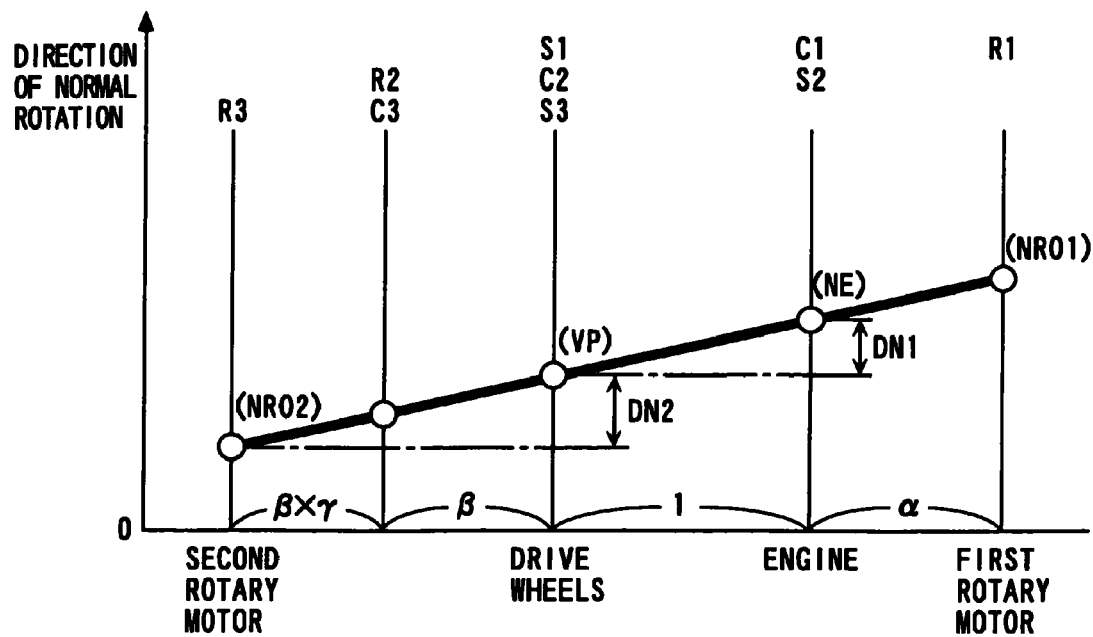
FIG. 6 is a view showing a collinear chart illustrating an example of the relationship between the rotational speeds of the five rotary elements formed by the first to third planetary gear units appearing in FIG. 1, the rotational speed of the engine, the vehicle speed, and the rotational speeds of the first and second rotors, in a second transmission mode.

As described above, when in the first transmission mode, the first rotor speed NRO1, the engine speed NE, the vehicle speed VP, and the second rotor speed NRO2 are in a collinear relationship, as shown e.g. in FIG. 5, whereas when in the second transmission mode, they are in a collinear relationship, as shown e.g. in FIG. 6. It should be noted that the direction of rotation of the crankshaft is the same as the direction of normal rotation of the drive wheels DW and DW, and hereinafter, in the other collinear charts including the collinear charts in FIGS. 5 and 6, the same direction as the direction of rotation of the crankshaft is shown as "the direction of normal rotation", and a direction reverse thereto is shown as "the direction of reverse rotation"

As shown in FIGS. 5 and 6, the distance between the drive wheels DW and DW and the second rotary motor 30 in the collinear charts is shorter in the first transmission mode than in the second transmission mode, and hence the ratio (DN2/DN1) between the rotational difference DN2 between the second rotor speed NRO2 and the vehicle speed VP and the rotational difference DN1 between the vehicle speed VP and the engine speed NE is smaller in the first transmission mode.

In the power unit 1 constructed as above, the drive wheels DW and DW are driven by using power from the first rotary motor 20, the second rotary motor 30, and the engine 3. Further, when driving the drive wheels DW and DW by using the power from the engine 3, power generation is performed by the first rotary motor 20 using part of the power from the engine 3, and the generated power is supplied to the second rotary motor 30, and the first and second rotor speeds NRO1 and NRO2 are controlled, to thereby transmit the power from the engine 3 to the drive wheels DW and DW while steplessly changing the rotational speed.

Figure 7:
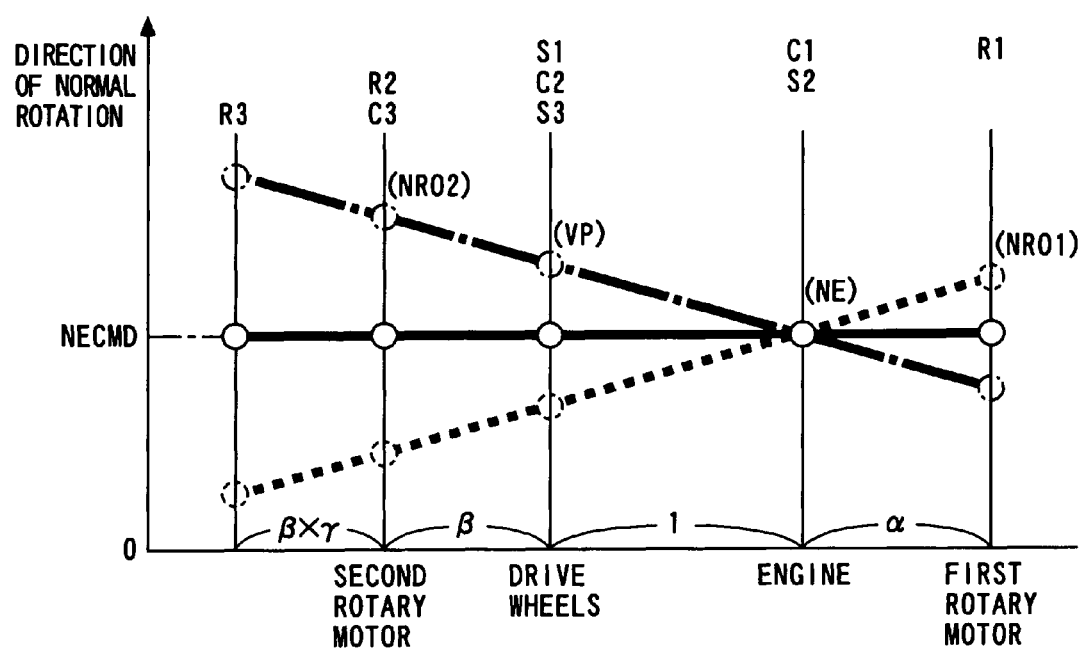
FIG. 7 is a diagram which is useful in explaining transmission operations by first and second rotary motors of the FIG. 1 power unit.

More specifically, as indicated by a broken line in FIG. 7, by controlling the first rotor speed NRO1 to a higher value the engine speed NE and the second rotor speed NRO2 to a lower value than the same, it is possible to transmit the power from the engine 3 to the drive wheels DW and DW while steplessly reducing the rotational speed. Inversely, as indicated by a one-dot chain line in FIG. 7, by controlling the first rotor speed NRO1 to a lower value than the engine speed NE and the second rotor speed NRO2 to a higher value than the same, it is possible to transmit the power from the engine 3 to the drive wheels DW and DW while steplessly increasing the engine speed NE. Hereinafter, to drive the drive wheels DW and DW by the power from the engine 3 while steplessly changing the rotational speed as described above is referred to as "the engine transmission drive".

During the engine transmission drive, the power from the engine 3 is controlled such that it becomes equal to a demanded output determined according to the vehicle speed VP and a demanded torque PMCMD demanded of the vehicle. The demanded torque PMCMD is calculated by searching a map, not shown, e.g. according to the vehicle speed VP and the accelerator pedal opening AP. Further, the first and second rotor speeds NRO1 and NRO2 are controlled such that the engine speed NE become equal to a target engine speed NECMD. The target engine speed NECMD is calculated by searching a target engine speed map, not shown, e.g. according to the vehicle speed VP and the demanded torque PMCMD. In this target engine speed map, the target engine speed NECMD is set to a value enabling the best fuel economy of the engine 3 to be obtained, with respect to the current vehicle speed VP and demanded torque PMCMD. Thus, during the engine transmission drive, it is possible to obtain the best fuel economy of the engine 3.

Further, during the above-described engine transmission drive, when the vehicle is in a high vehicle-speed traveling state in which the vehicle speed VP is higher than the engine speed NE, the first transmission mode is used (see FIG. 5), whereas when the vehicle is in a low-to-medium vehicle-speed traveling state in which the vehicle speed VP is lower than the engine speed NE the second transmission mode is used (see FIG. 6). Furthermore, in this case, switching between the first transmission mode and the second transmission mode is performed when the rotational speed of the third carrier C3 and that of the third ring gear R3 are equal to each other, that is, when the engine speed NE, the vehicle speed VP, and the first and second rotor speeds NRO1 and NRO2 are equal to each other. It should be noted that FIG. 7 shows only a collinear chart in the first transmission mode for convenience.

As described above, according to the present embodiment, since the first transmission mode is used when the vehicle is traveling in the high vehicle-speed traveling state during the engine transmission drive, it is possible to prevent the excessive rotation of the second rotary motor 30, and therefore dragging loss can be prevented from being caused by the excessive rotation of the second rotary motor 30, thereby making it possible to enhance the efficiency of the power unit 1. Further, since the second transmission mode is used when a larger torque is required when the vehicle is in the low-to-medium vehicle-speed traveling state, it is possible to reduce the torque of the second rotary motor 30, and hence it is possible to downsize the second rotary motor 30. Furthermore, since the existing first and second planetary gear units PS1 and PS2 that are combined with each other are used as the power transmission mechanism of the present invention, it is possible to construct the power unit 1 easily and inexpensively without using a special mechanism. For the same reason, it is possible to downsize the power unit 1.

Further, since switching between the first transmission mode and the second transmission mode is performed when the rotational speed of the third carrier C3 and that of the third ring gear R3 are equal to each other, it is possible to smoothly perform the switching while maintaining the rotations of the drive wheels DW and DW and the engine 3, thereby making it possible to ensure excellent drivability.

Figure 8:
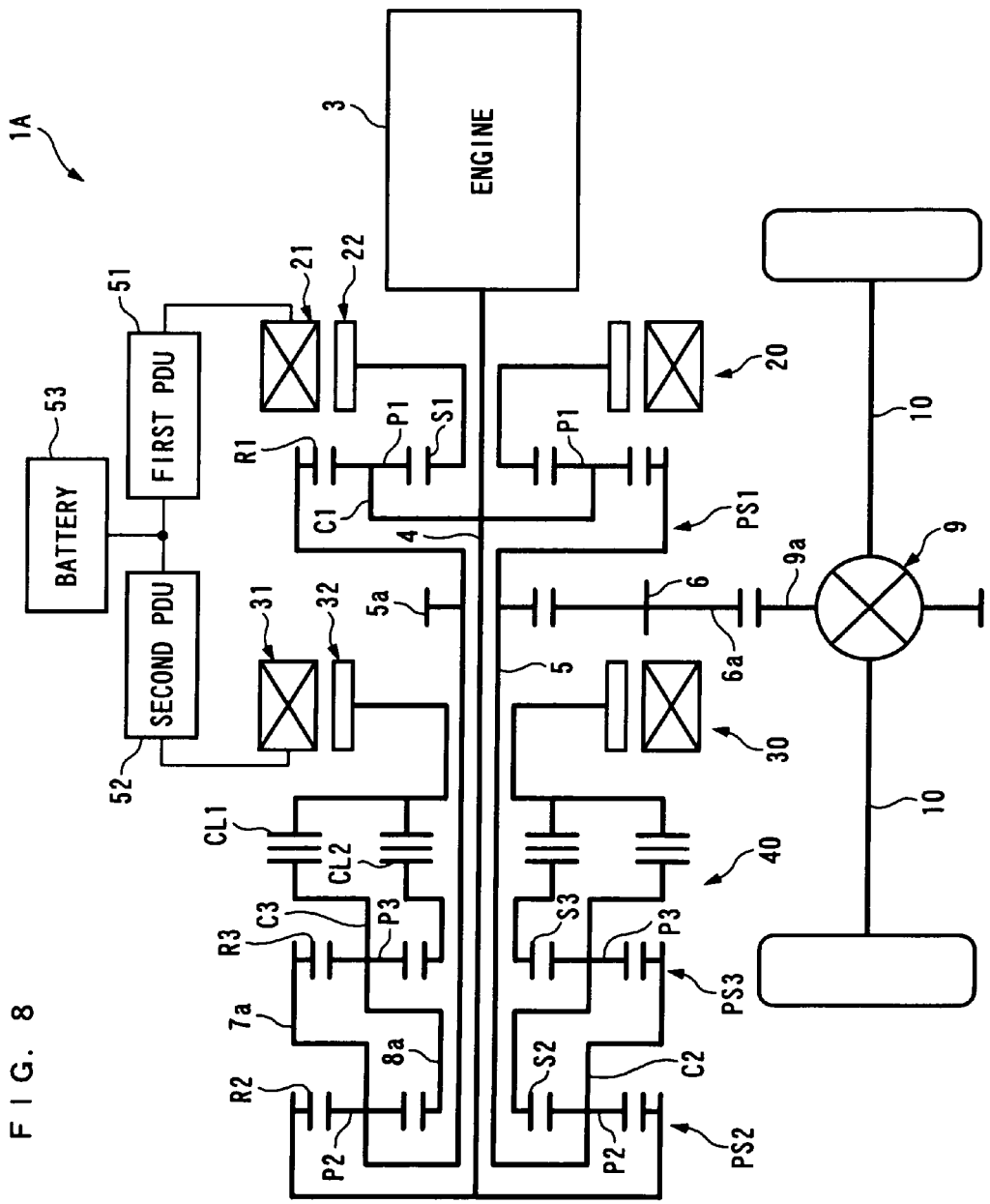
FIG. 8 is a schematic view of a power unit according to a second embodiment of the present invention.

FIG. 8 schematically shows a power unit 1A according to a second embodiment of the present invention. The power unit 1A according to the present embodiment is distinguished from the above-described first embodiment only in the connecting relationship between the first to third planetary gear units PS1 to PS3, the engine 3, the drive wheels DW and DW, and the first and second rotary motors 20 and 30.

More specifically, the first carrier C1 and the second ring gear R2 are connected to each other via the first connection shaft 4, and the first ring gear R1 and the second carrier C2 are connected to each other via the second connection shaft 5. The elements of the first and second planetary gear units PS1 and PS2 are connected to each other, as described above, thereby forming four rotary elements the respective rotational speeds of which are in a collinear relationship. In the present embodiment, the first sun gear S1 corresponds to a first element, the second carrier C2 and the second ring gear R2 to a second element, the first ring gear R1 and the second carrier C2 to a third element, and the second sun gear S2 to a fourth element. Further, the engine 3 is connected to the first carrier C1 and the second ring gear R2, and the drive wheels DW and DW are connected to the first ring gear R1 and the second carrier C2. Furthermore, the first rotary motor 20 is connected to the first sun gear S1.

Further, the second carrier C2 and the third ring gear R3 are connected to each other via a third connection shaft 7a, and the second sun gear S2 and the third carrier C3 are connected to each other via a fourth connection shaft 8a. The third connection shaft 7a is formed to be hollow, and is rotatably supported by bearings, not shown. The fourth connection shaft 8a is rotatably fitted in the third connection shaft 7a. The fourth connection shaft 8a is formed to be hollow, and is rotatably supported by bearings, not shown. The second connection shaft 5 is rotatably fitted in the fourth connection shaft 8a. Further, the second rotor 32 is connected to the third carrier C3 and the third sun gear S3 via the first and second clutches CL1 and CL2, respectively. The five rotary elements the respective rotational speeds of which are in a collinear relationship are formed by connecting the elements of the first to third planetary gear units PS1 to PS3, as described above.

Figure 9:
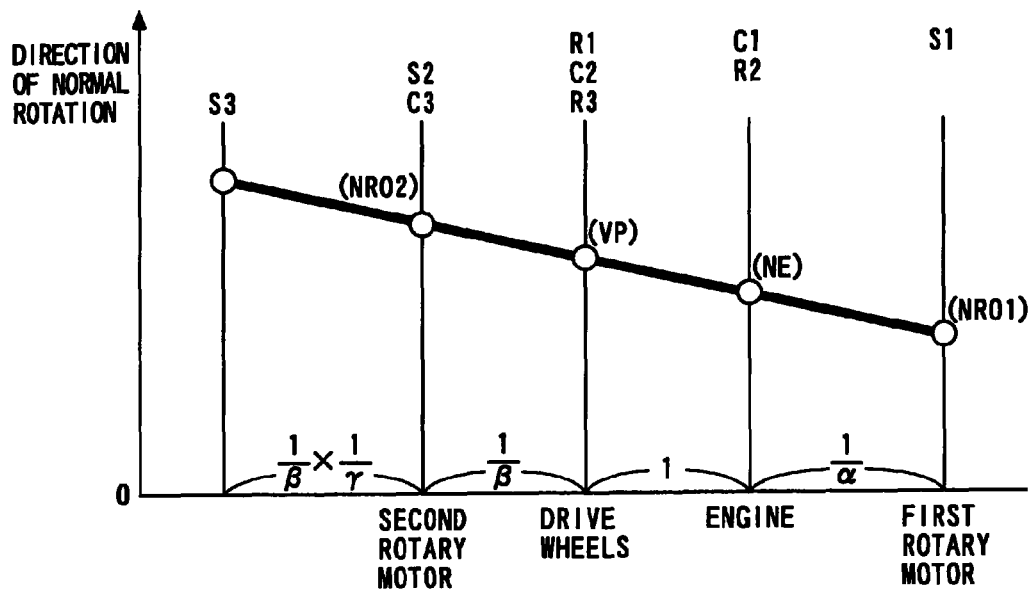
FIG. 9 is a view showing a collinear chart illustrating an example of the relationship between the respective rotational speeds of five rotary elements formed by first to third planetary gear units appearing in FIG. 8, the rotational speed of the engine, the vehicle speed, and the rotational speeds of the first and second rotors, in a first transmission mode.
Figure 10:
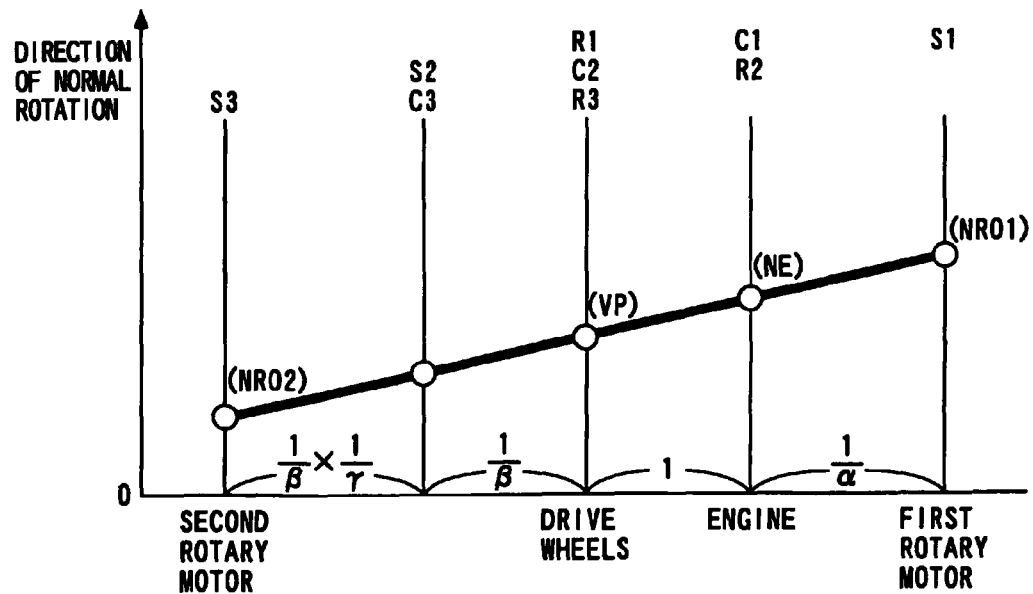
FIG. 10 is a view showing a collinear chart illustrating an example of the relationship between the respective rotational speeds of the five rotary elements formed by the first to third planetary gear units shown in FIG. 8, the rotational speed of the engine, the vehicle speed, and the rotational speeds of the first and second rotors, in a second transmission mode.

With this arrangement, the first rotor speed NRO1, the engine speed NE, the vehicle speed VP, and the second rotor speed NRO2 are in such a collinear relationship as shown e.g. in FIG. 9, in the first transmission mode (CL1: engaged, CL2: disengaged), whereas in the second transmission mode (CL1: disengaged, CL2: engaged), they are in such a collinear relationship as shown, e.g. in FIG. 10. Further, it is assumed that in FIGS. 9 and 10, a change in speed e.g. by the differential gear mechanism 9 is ignored.

In the power unit 1A constructed as above, the same operation as performed in the first embodiment is performed. Therefore, the present embodiment can provide the same advantageous effects as provided by the first embodiment.

Although in the power unit 1A constructed as above, the transmission 40 is disposed only between the second rotary motor 30 and the fourth element, this is not limitative, but it may be disposed only between the first rotary motor 20 and the first element. In this case, the third planetary gear unit PS3 and the first and second clutches CL1 and CL2 are connected to each other in the following manner: The first and second planetary gear units PS1 and PS2 are connected as described in the first embodiment, and the third sun gear S3 and the third carrier C3 are connected to the first carrier C1 and the first ring gear R1, respectively. Further, the first stator 21 is connected to the third carrier C3 and the third ring gear R3 via the first and second clutches CL1 and CL2, respectively.

Figure 11:
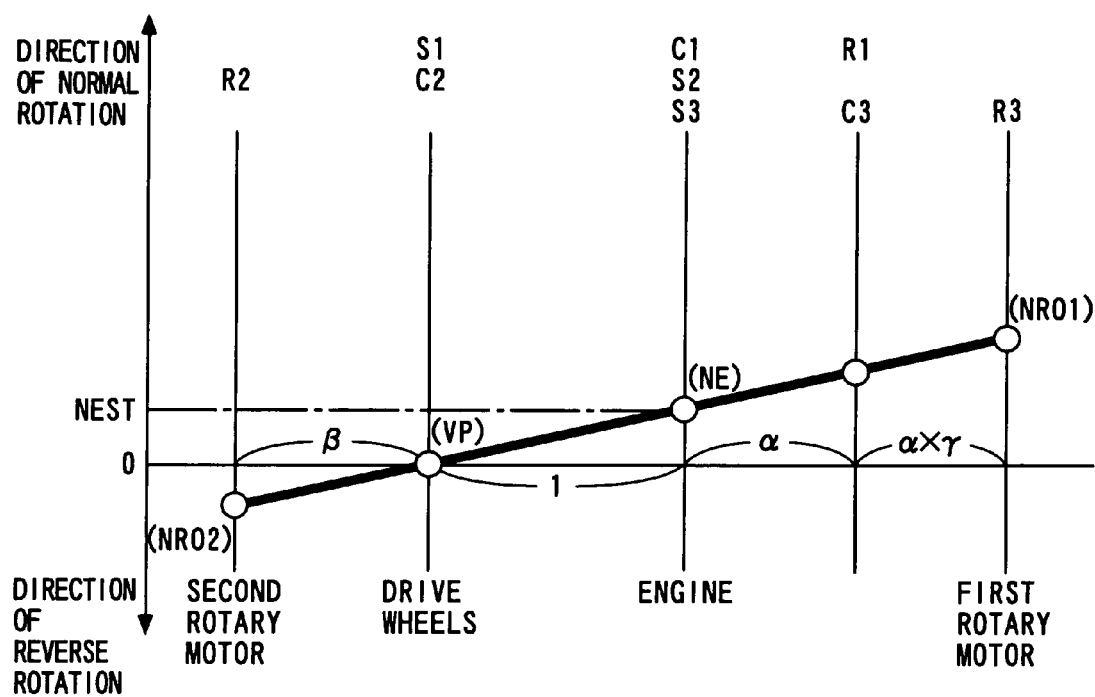
FIG. 11 is a view showing a collinear chart illustrating an example of the relationship between the respective rotational speeds of the five rotary elements formed by the first to third planetary gear units when a transmission is disposed between the first element and the first rotary motor, the rotational speed of the engine, the vehicle speed, and the rotational speeds of the first and second rotors, in a fourth transmission mode when the engine is started during stoppage of a vehicle.
Figure 12:
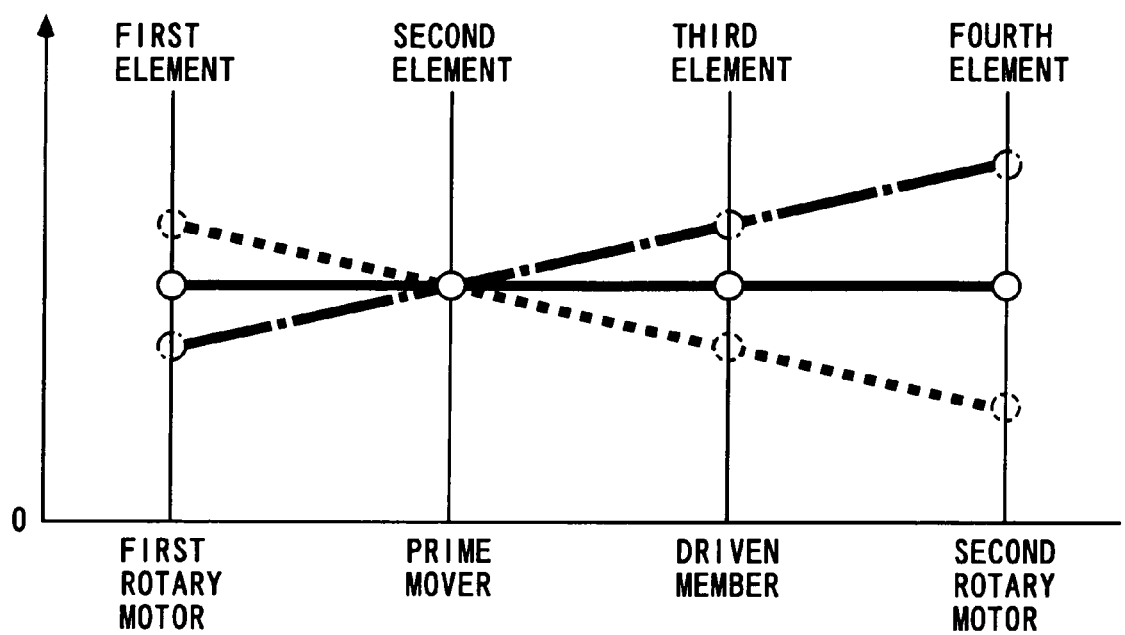
FIG. 12 is a diagram which is useful in explaining transmission operations by first and second rotary motors of the power unit according to the present invention.
Figure 13A:
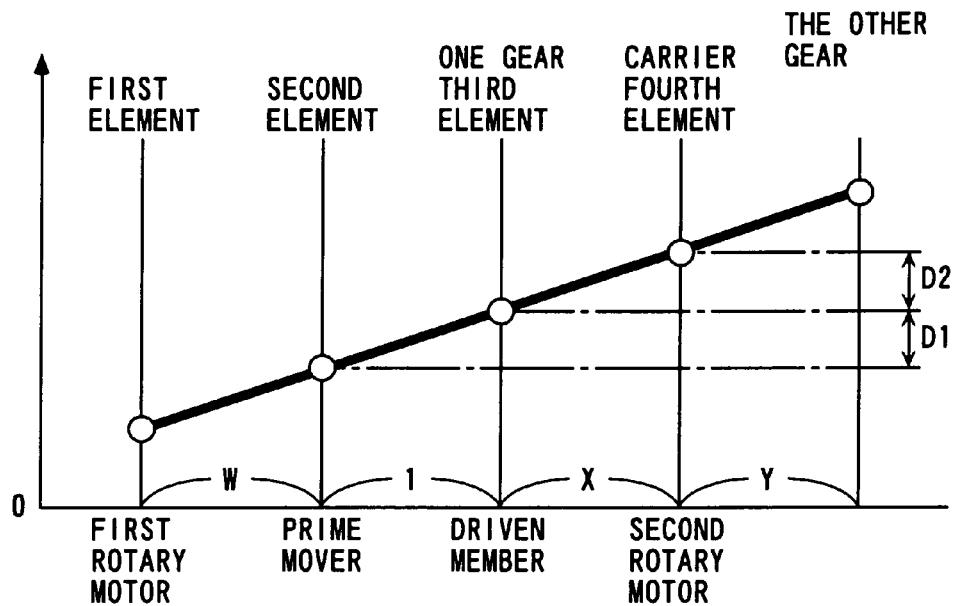
FIG. 13A is a view showing a collinear chart illustrating an example of the relationship between the respective rotational speeds of a prime mover, a driven member, the first and second rotary motors, one gear, a carrier, and the other gear, in a first transmission mode.
Figure 13B:
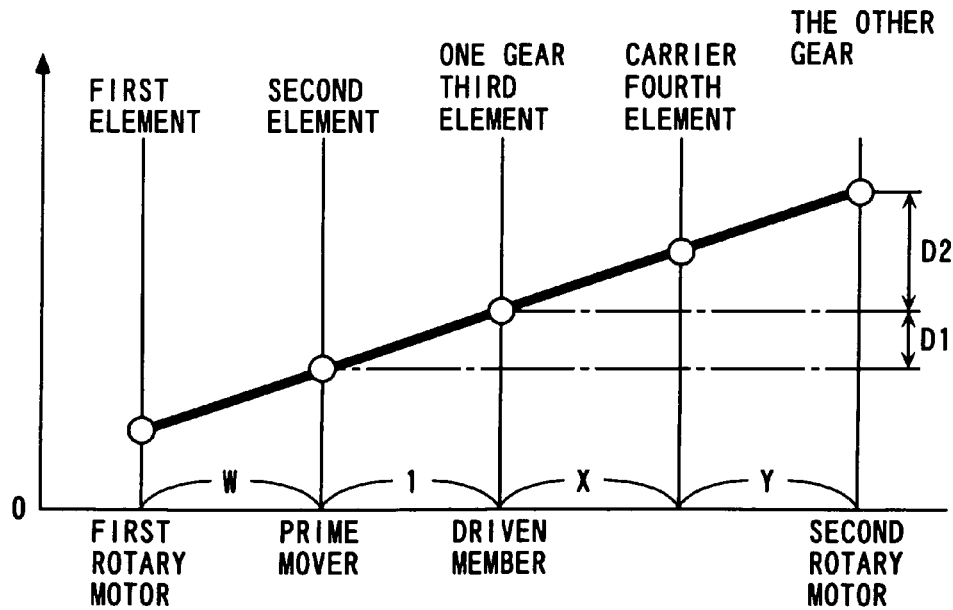
FIG. 13B is a view showing a collinear chart illustrating an example of the relationship between the respective rotational speeds of the prime mover, the driven member, the first and second rotary motors, the one gear, the carrier, and the other gear, in a second transmission mode.
Figure 14:
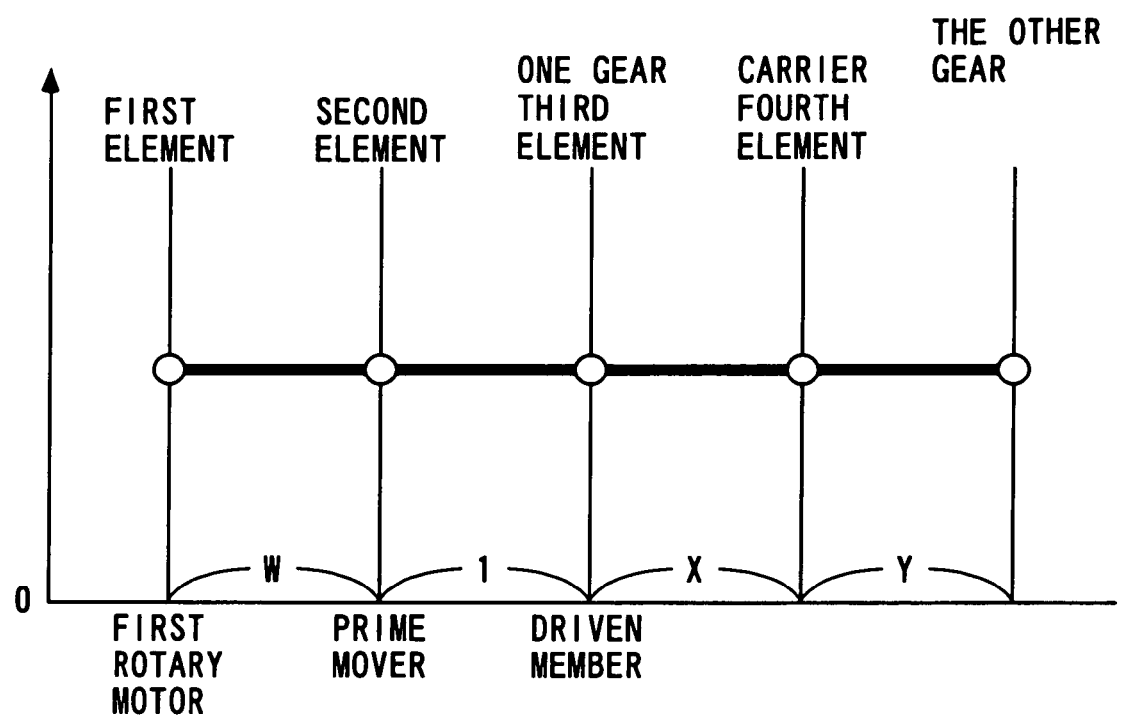
FIG. 14 is a diagram which is useful in explaining switching between the first and second transmission modes in the power unit according to the present invention.
Figure 15A:
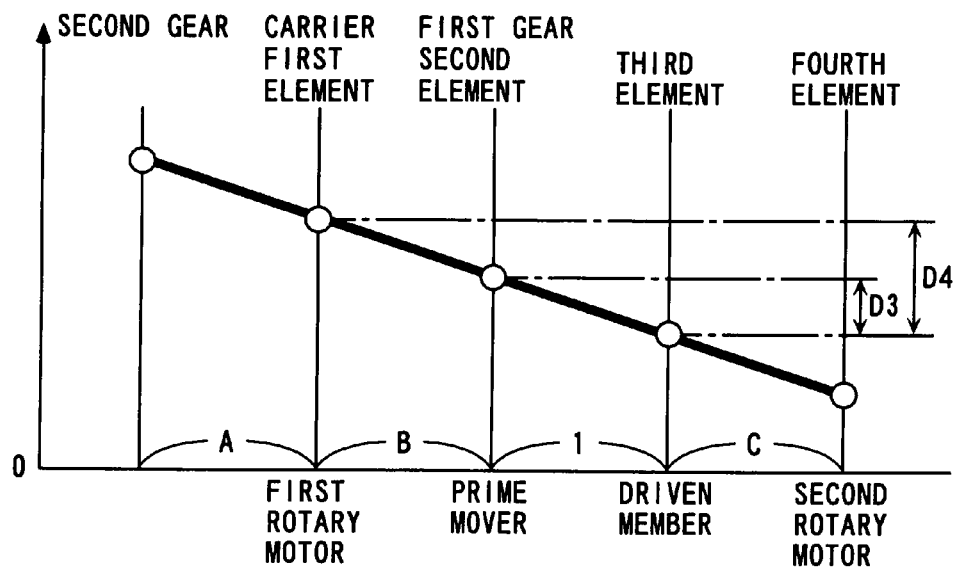
FIG. 15A is a view showing a collinear chart illustrating an example of the relationship between rotational speeds of the prime mover, the driven member, the first and second rotary motors, a first gear, the carrier, and a second gear, in a third transmission mode.
Figure 15B:
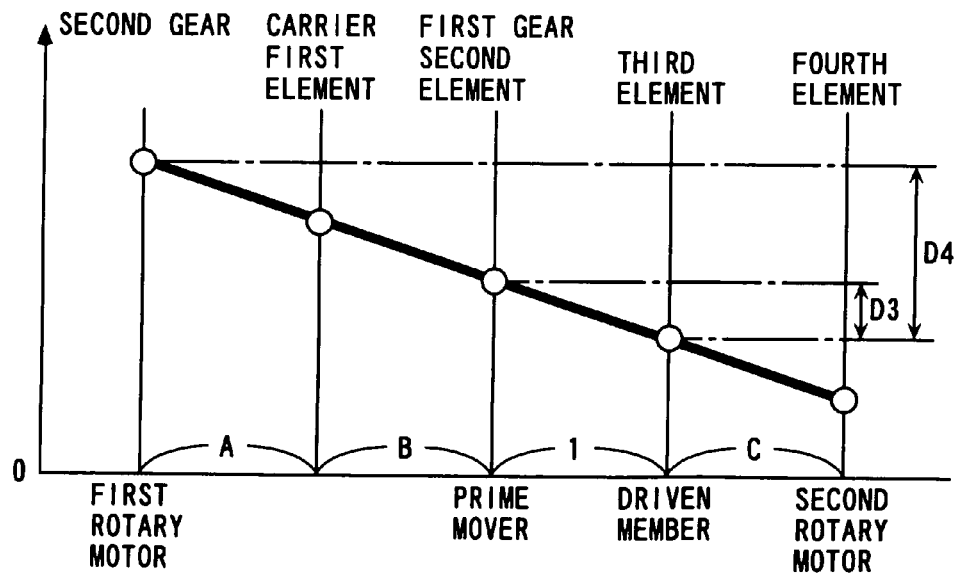
FIG. 15B is a view showing a collinear chart illustrating an example of the relationship between the respective rotational speeds of the prime mover, the driven member, the first and second rotary motors, the first gear, the carrier, and the second gear, in a fourth transmission mode.

Based on the above-described connecting relationship between the elements, in a third transmission mode in which the first clutch CL1 is engaged and the second clutch CL2 is disengaged, the relationship between the respective rotational speeds of the elements of the first to third planetary gear units PS1 to PS3, the first rotor speed NRO1, the engine speed NE, the vehicle speed VP, and the second rotor speed NRO2 is represented by such a single collinear chart as shown e.g. in FIG. 11. Further, in a fourth transmission mode in which the first clutch CL1 is disengaged and the second clutch CL2 is engaged, the relationship between these rotational speeds is represented by such a single collinear chart as shown e.g. in FIG. 16.

Further, in this case, it is preferable to use the third and fourth transmission modes e.g. in the following manner: The fourth transmission mode is used when the engine 3 is started during stoppage of the vehicle. The start of the engine 3 during stoppage of the vehicle is performed as follows: Electric power is supplied to the first rotary motor 20 to cause the first rotor 22 to rotate together with the third ring gear R3 in the direction of normal rotation, as shown in FIG. 11, and at the same time, electric power is generated by the second rotary motor 30. In this case, the electric power supplied to the first rotary motor 20, the electric power generated by the second rotary motor 30, and the first and second rotor speeds NRO1 and NRO2 are controlled such that the vehicle speed VP becomes equal to 0, and at the same time the engine speed NE becomes equal to a predetermined engine speed NEST suitable for starting the engine 3 (see FIG. 11). In this state, the engine 3 is started by controlling fuel injection valves, not shown, and ignition operations by respective spark plugs, not shown, of the engine 3 according to the aforementioned crank angle position.

As described above, when the engine 3 is started during stoppage of the vehicle, electric power is supplied to the first rotary motor 20 to generate torque, to thereby increase the engine speed NE. When the start of the engine 3 during stoppage of the vehicle is performed using the third and fourth transmission modes, the relationship between a torque TCRK transmitted to the crankshaft, and respective torques TM1 and TM2 of the first and second rotary motors 20 and 30 are expressed by the following equations (9) and (10):

$$TM1 = \{1/(1+\alpha)\} \times (\beta \times TM2 + TCRK) \quad (9)$$

$$TM1 = \{1/(1+\alpha+\alpha\times\gamma)\} \times (\beta \times TM2 + TCRK) \quad (10)$$

As is apparent from the equations (9) and (10), when the engine 3 is started during stoppage of the vehicle, by using the fourth transmission mode used, it is possible to reduce the torque TM1 of the first rotary motor 20.

Figure 16:
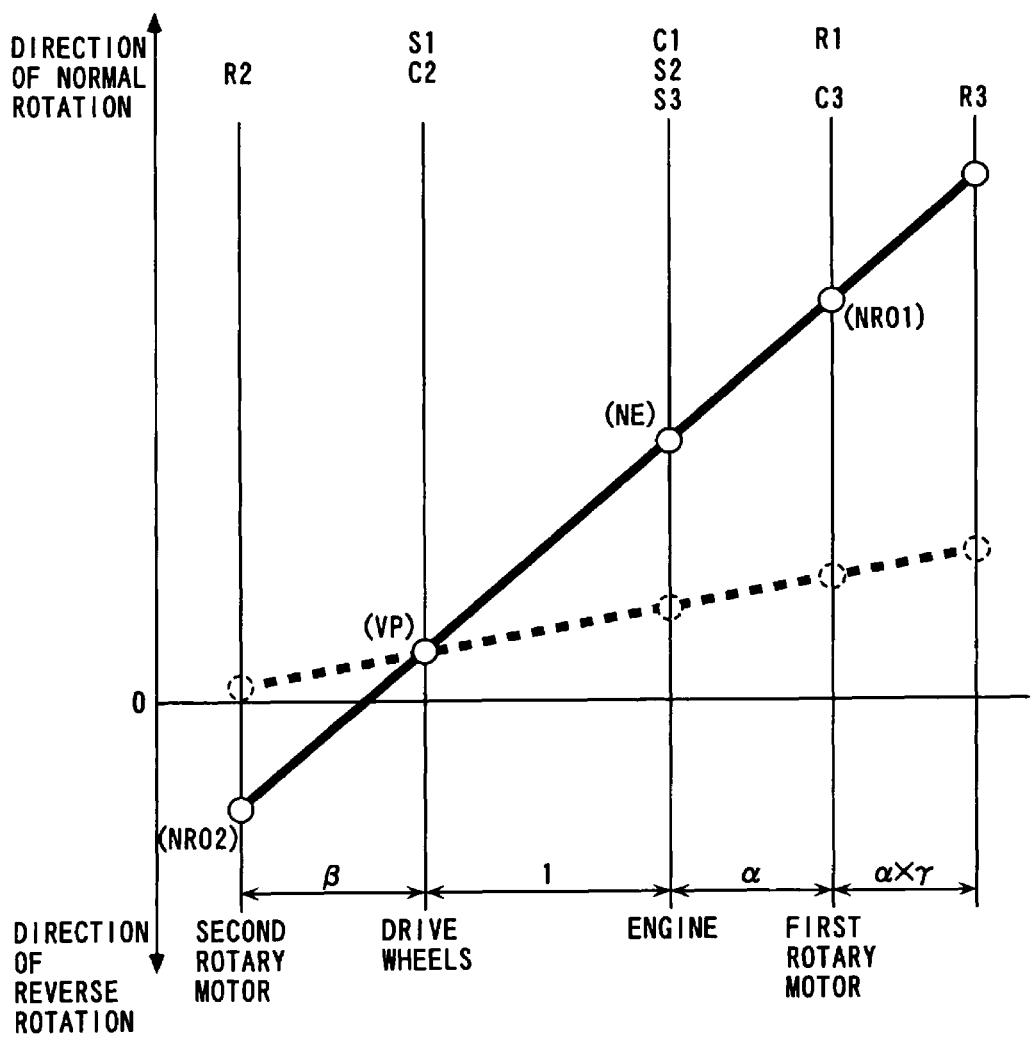
FIG. 16 is a view showing a collinear chart illustrating an example of the relationship between the respective rotational speeds of the five rotary elements formed by the first to third planetary gear units in a case where the transmission is disposed between the first element and the first rotary motor, the rotational speed of the engine, the vehicle speed, and the respective rotational speeds of the first and second rotors, shown when the vehicle is rapidly accelerated from a low-speed cruising state thereof, and is at the same time in the third transmission mode.

Further, the third transmission mode is used when rapidly accelerating the vehicle in a state of low-speed cruising. Such rapid acceleration of the vehicle is performed in the following manner: In FIG. 16, a broken line shows an example of the relationship between the engine speed NE, the vehicle speed VP, and so forth, during the low-speed cruising of the vehicle in the state of low-speed cruising, while a solid line shows the relationship between the same at the start of the above-mentioned rapid acceleration of the vehicle As shown in FIG. 16, the engine speed NE is rapidly increased from a predetermined engine speed suitable for the low-speed cruising of the vehicle indicated by the broken line to such a predetermined engine speed as indicated by the solid line which makes it possible to obtain the maximum torque from the engine 3. In this case, as shown by the solid line in FIG. 16, the vehicle speed VP is not immediately increased, and hence as the engine speed NE becomes higher than the vehicle speed VP, the difference between the engine speed NE and the vehicle speed VP increases to cause the second rotor 32 to rotate together with the second ring gear R2 in the direction of reverse rotation. Further, for causing a torque from the second rotary motor 30 in the direction of normal rotation to act on the reversely rotating second ring gear R2, electric power is generated by the second rotary motor 30. Furthermore, the electric power generated by the second rotary motor 30 is supplied to the first rotary motor 20 to cause the first rotor 22 to rotate together with the third carrier C3 in the direction of normal rotation. In this case, the vehicle speed VP does not increase instantly as mentioned above, and hence as shown by the solid line in FIG. 16, the first rotor speed NRO1 becomes much higher than the vehicle speed VP.

By controlling the operations of the engine 3 and the first and second rotary motors 20 and 30 as described above, torques from the engine 3 and the first and second rotary motors 20 and 30 in the direction of normal rotation are caused to act on the drive wheels DW and DW, which results in the rapid increase in the vehicle speed VP. Further, as is apparent from FIGS. 11 and 16, the distance between the drive wheels DW and DW and the first rotary motor 20 in the collinear charts is shorter in the third transmission mode than in the fourth transmission mode, and hence the ratio between the rotational difference between the first rotor speed NRO1 and the vehicle speed VP and the rotational difference between the vehicle speed VP and the engine speed NE is smaller in the third transmission mode. Therefore, when starting to rapidly accelerate the vehicle from the state of low-speed cruising, it is possible to reduce the first rotor speed NRO1 in the third transmission mode than in the fourth transmission mode. Therefore, by using the third transmission mode in such a case, it is possible to prevent the excessive rotation of the first rotary motor 20.

Further, by performing switching between the third and fourth transmission modes when the rotational speed of the third carrier C3 and that of the third ring gear R3 are equal to each other, similarly to the first embodiment, it is possible to smoothly perform the switching while maintaining the rotations of the drive wheels DW and DW and the engine 3, and thereby ensure excellent drivability.

Alternatively, transmissions 40 may be disposed respectively between the first rotary motor 20 and the first element and between the second rotary motor 30 and the fourth element. In this case, one transmission 40 between the first rotary motor 20 and the first element is connected to the other elements, as described in the present embodiment, while the other transmission 40 between the second rotary motor 30 and the fourth element is connected to the other elements, as shown in FIG. 11. This makes it possible to obtain the aforementioned advantageous effects provided by disposing the transmission 40 between the first rotary motor 20 and the first element, and the aforementioned advantageous effects provided by disposing the transmission 40 between the second rotary motor 30 and the fourth element.

It should be noted that the present invention is by no means limited to the embodiment described above, but it can be practiced in various forms. For example, although in the above-described embodiment, four elements are used for the power transmission mechanism, by way of example, this is not limitative, but the number of the elements may be larger. Further, the connecting relationship between the elements of the first and second planetary gear units PS1 and PS2 is not limited to those in the above-described embodiments, but it may be set as desired insofar as it can form the first to fourth elements in the present invention. Furthermore, in place of the first to third planetary gear units PS1 to PS3, units may be used each of which includes a plurality of rollers for transmitting power by frictions between surfaces of the rollers and has capabilities equivalent to those of a planetary gear unit.

Further, although in the above-described embodiment, as a transmission, the transmission 40 is used which changes the ratio (DN2/DN1) between the rotational difference DN2 between the second rotor speed NRO2 and the vehicle speed VP and the rotational difference DN1 between the vehicle speed VP and the engine speed NE, it is possible to use another desired transmission. For example, a transmission of a general type may be employed which is comprised of an input shaft connected to the second rotor 32, an output shaft connected to the second ring gear R2, a plurality of planetary gear units, and an electromagnetic brake, and is configured to be capable of steplessly changing the ratio between the rotational speed of the input shaft and that of the output shaft. This also applies to the case in which the transmission 40 is disposed between the first rotary motor 20 and the first element.

Furthermore, although in the above-described embodiment, a gasoline engine is used as a prime mover, this is not limitative, but a diesel engine and an external combustion engine may be used, for example. Further, although in the above-described embodiment, brushless DC motors are used as the first and second rotary motors 20 and 30, this is not limitative, but any other suitable motors, such as AC motors, may be used insofar as they generate power (motive power) by electric power supplied thereto, and generate electric power by power (motive power) input thereto.

Furthermore, although in the above-described embodiment, the controller for controlling the internal combustion engine 3, the first and second rotary motors 20 and 30, and the first and second clutches CL1 and CL2 is implemented by the ECU 2 and the first and second PDUs 51 and 52, this is not limitative, but the controller may be implemented e.g. by an electric circuit having a microcomputer installed thereon. Further, although in the above-described embodiments, the present invention is applied to a vehicle, this is not limitative, but for example, it can be applied to a boat, an aircraft, and so forth.

It is further understood by those skilled in the art that the foregoing are preferred embodiments of the invention, and that various changes and modifications may be made without departing from the spirit and scope thereof.

What is claimed is:

1. A power unit for driving a driven member, comprising:
a prime mover;
a power transmission mechanism that includes at least first to fourth elements capable of transmitting power to each other, said first to fourth elements being configured such that respective rotational speeds of said first to fourth elements satisfy a collinear relationship and are in a line in a collinear chart representing the collinear relationship, said second element and said third element being mechanically connected to said prime mover and the driven member, respectively;
a first rotary motor mechanically connected to said first element;
a second rotary motor mechanically connected to said fourth element and electrically connected to said first rotary motor; and
a transmission disposed at least one of respective locations between said first rotary motor and said first element and between said second rotary motor and said fourth element.

2. A power unit as claimed in claim 1, wherein said power transmission mechanism comprises a plurality of planetary gear units combined with each other.

3. A power unit as claimed in claim 1, wherein said transmission is disposed between said second rotary motor and said fourth element.

4. A power unit as claimed in claim 3, wherein said transmission includes a planetary gear unit that has a sun gear, a ring gear, and a carrier rotatably supporting a planetary gear in mesh with said sun gear and said ring gear, a first clutch, and a second clutch,
wherein one of said sun gear and said ring gear is mechanically connected to said third element,
wherein said carrier is mechanically connected to said fourth element and is mechanically connected to said second rotary motor via said first clutch, and
wherein the other of said sun gear and said ring gear is mechanically connected to said second rotary motor via said second clutch.

5. A power unit as claimed in claim 1, wherein said transmission is disposed between said first rotary motor and said first element, said transmission including a planetary gear unit that has a sun gear, a ring gear, and a carrier rotatably supporting a planetary gear in mesh with said sun gear and said ring gear, a first clutch, and a second clutch,
wherein one of said sun gear and said ring gear is mechanically connected to said second element,
wherein said carrier is mechanically connected to said first element and is mechanically connected to said first rotary motor via said first clutch, and wherein the other of said sun gear and said ring gear is mechanically connected to said first rotary motor via said second clutch.

6. A power unit as claimed in claim 1, wherein said transmission comprises a first transmission disposed between said first rotary motor and said first element and a second transmission disposed between said second rotary motor and said fourth element, said first transmission including a first planetary gear unit that has a first sun gear, a first ring gear, and a first carrier rotatably supporting a first planetary gear in mesh with said first sun gear and said first ring gear, a first clutch, and a second clutch, said second transmission including a second planetary gear unit that has a second sun gear, a second ring gear, and a second carrier rotatably supporting a second planetary gear in mesh with said second sun gear and said second ring gear, a third clutch, and a fourth clutch, wherein one of said first sun gear and said first ring gear is mechanically connected to said second element, wherein said first carrier is mechanically connected to said first element and is mechanically connected to said first rotary motor via said first clutch, wherein the other of said first sun gear and said first ring gear is mechanically connected to said first rotary motor via said second clutch, wherein one of said second sun gear and said second ring gear is mechanically connected to said third element, wherein said second carrier is mechanically connected to said fourth element and is mechanically connected to said second rotary motor via said third clutch, and wherein the other of said second sun gear and said second ring gear is mechanically connected to said second rotary motor via said fourth clutch.

* * * * *